US010305574B2

(12) United States Patent
Xiong et al.

(10) Patent No.: US 10,305,574 B2
(45) Date of Patent: *May 28, 2019

(54) COVERAGE EXTENSION LEVEL FOR COVERAGE LIMITED DEVICE

(71) Applicant: Intel IP Corporation, Santa Clara, CA (US)

(72) Inventors: Gang Xiong, Beaverton, OR (US); Jong-Kae Fwu, Sunnyvale, CA (US); Seunghee Han, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 15/186,832

(22) Filed: Jun. 20, 2016

(65) Prior Publication Data

US 2016/0359548 A1    Dec. 8, 2016

Related U.S. Application Data

(63) Continuation of application No. 14/311,938, filed on Jun. 23, 2014, now Pat. No. 9,374,151.

(Continued)

(51) Int. Cl.
*H04B 7/155* (2006.01)
*H04W 4/70* (2018.01)
(Continued)

(52) U.S. Cl.
CPC ......... *H04B 7/15507* (2013.01); *H04L 5/005* (2013.01); *H04W 4/70* (2018.02);
(Continued)

(58) Field of Classification Search
CPC .... H04B 7/15507; H04L 5/005; H04W 48/12; H04W 4/70; H04W 56/00; H04W 72/0446
(Continued)

(56) References Cited

U.S. PATENT DOCUMENTS 9,118,452 B2   8/2015  Park et al.
9,210,675 B2   12/2015 Dinan
(Continued)

FOREIGN PATENT DOCUMENTS

CN    101998418 A    3/2011
CN    102111208 A    6/2011
(Continued)

OTHER PUBLICATIONS

"[DRAFT] LS on KeNB* generation in case of MFBI", R2-131153; 3GPP TSG RAN WG2 Meeting #80 bis, (May 24, 2013), 1 pg.
(Continued)

*Primary Examiner* — Mark H Rinehart
*Assistant Examiner* — Kokou R Detse
(74) *Attorney, Agent, or Firm* — Schwegman Lundberg & Woessner, P.A.

(57) ABSTRACT

Generally discussed herein are systems, apparatuses, and methods that can provide a coverage enhancement to a coverage limited device. According to an example a method can include repeating a Physical Broadcast Channel (PBCH) data transmission multiple times over multiple sub-frames to a coverage limited Machine Type Communication (MTC) User Equipment (UE), or repeating the PBCH data transmission two or three times within one sub-frame to the coverage limited MTC UE.

19 Claims, 11 Drawing Sheets

Related U.S. Application Data

(60) Provisional application No. 61/898,425, filed on Oct. 31, 2013, provisional application No. 61/879,014, filed on Sep. 17, 2013, provisional application No. 61/863,902, filed on Aug. 8, 2013.

(51) Int. Cl.
*H04W 56/00* (2009.01)
*H04L 5/00* (2006.01)
*H04W 72/04* (2009.01)
*H04W 48/12* (2009.01)

(52) U.S. Cl.
CPC ....... *H04W 56/00* (2013.01); *H04W 72/0446* (2013.01); *H04W 48/12* (2013.01); *Y02D 70/126* (2018.01)

(58) Field of Classification Search
USPC .......................................................... 370/315
See application file for complete search history.

(56) References Cited

U.S. PATENT DOCUMENTS

| | | |
|---|---|---|
| 9,258,747 B2 | 2/2016 | Sivanesan et al. |
| 9,374,151 B2 | 6/2016 | Xiong et al. |
| 2003/0013443 A1 | 1/2003 | Willars et al. |
| 2007/0291733 A1 | 12/2007 | Doran et al. |
| 2008/0080428 A1 | 4/2008 | Jappila et al. |
| 2008/0205379 A1 | 8/2008 | Naqvi |
| 2009/0016249 A1 | 1/2009 | Li et al. |
| 2009/0270098 A1 | 10/2009 | Gallagher et al. |
| 2010/0215034 A1 | 8/2010 | Klein et al. |
| 2011/0080825 A1 | 4/2011 | Dimou et al. |
| 2011/0164562 A1 | 7/2011 | Qiu et al. |
| 2011/0280212 A1 | 11/2011 | Lv |
| 2012/0020291 A1 | 1/2012 | Nasielski et al. |
| 2012/0063298 A1 | 3/2012 | Yi et al. |
| 2012/0088498 A1 | 4/2012 | Xiao et al. |
| 2012/0202557 A1 | 8/2012 | Olofsson et al. |
| 2012/0218970 A1 | 8/2012 | Westberg et al. |
| 2012/0236776 A1 | 9/2012 | Zhang et al. |
| 2012/0276897 A1 | 11/2012 | Kwon et al. |
| 2012/0327821 A1 | 12/2012 | Lin et al. |
| 2012/0327894 A1 | 12/2012 | Axmon et al. |
| 2013/0022023 A1 | 1/2013 | Aydin |
| 2013/0023269 A1 | 1/2013 | Wang et al. |
| 2013/0044690 A1 | 2/2013 | Shaheen |
| 2013/0051507 A1 | 2/2013 | Jantunen et al. |
| 2013/0109301 A1 | 5/2013 | Hakola et al. |
| 2013/0121249 A1 | 5/2013 | Ji et al. |
| 2013/0183963 A1 | 7/2013 | Turtinen et al. |
| 2013/0183974 A1 | 7/2013 | Johansson et al. |
| 2013/0332559 A1 | 12/2013 | Mas Ivars et al. |
| 2014/0148174 A1 | 5/2014 | Teyeb et al. |
| 2014/0301305 A1 | 10/2014 | Xu et al. |
| 2015/0043420 A1 | 2/2015 | Xiong et al. |
| 2015/0049707 A1 | 2/2015 | Vajapeyam et al. |
| 2015/0078335 A1 | 3/2015 | Sivanesan et al. |
| 2015/0117183 A1 | 4/2015 | Heo et al. |
| 2015/0195750 A1 | 7/2015 | Sivanesan et al. |
| 2015/0195865 A1 | 7/2015 | Lee et al. |
| 2015/0207672 A1 | 7/2015 | Xu et al. |
| 2016/0044567 A1 | 2/2016 | Baghel et al. |
| 2016/0219541 A1 | 7/2016 | Chatterjee et al. |
| 2016/0227580 A1 | 8/2016 | Xiong et al. |
| 2016/0234847 A1 | 8/2016 | Zhang et al. |
| 2016/0255602 A1 | 9/2016 | Zaus |
| 2016/0255615 A1 | 9/2016 | Chatterjee et al. |
| 2016/0255640 A1 | 9/2016 | Zitzmann et al. |

FOREIGN PATENT DOCUMENTS

| | | | |
|---|---|---|---|
| CN | 102387559 A | 3/2012 | |
| CN | 105379148 A | 3/2016 | |
| CN | 105556994 A | 5/2016 | |
| CN | 105557051 A | 5/2016 | |
| CN | 105557052 A | 5/2016 | |
| CN | 105594140 A | 5/2016 | |
| CN | 105594266 A | 5/2016 | |
| CN | 106411490 A | 2/2017 | |
| EP | 3031147 A1 | 6/2016 | |
| EP | 3063883 A1 | 9/2016 | |
| EP | 3063982 A1 | 9/2016 | |
| EP | 3064012 A1 | 9/2016 | |
| HK | 1221826 A | 6/2017 | |
| KR | 1020090124788 A | 12/2009 | |
| KR | 1020110038571 A | 4/2011 | |
| KR | 102016003923 A | 4/2016 | |
| WO | WO-2012150815 A2 | 11/2012 | |
| WO | WO-2012159270 A1 | 11/2012 | |
| WO | WO-2013108048 A1 | 7/2013 | |
| WO | WO-2013108048 A1 * | 7/2013 | ............. H04W 4/70 |
| WO | WO-2015021320 A1 | 2/2015 | |
| WO | WO-2015042100 A1 | 3/2015 | |
| WO | WO-2015065619 A1 | 5/2015 | |
| WO | WO-2015065768 A1 | 5/2015 | |
| WO | WO-2015065881 A1 | 5/2015 | |
| WO | WO-2015065947 A1 | 5/2015 | |
| WO | WO-2015066281 A1 | 5/2015 | |
| WO | WO 2015066476 A1 | 5/2015 | |

OTHER PUBLICATIONS

"U.S. Appl. No. 14/279,562, Notice of Allowance dated Sep. 4, 2015", 9 pgs.
"U.S. Appl. No. 14/311,938, Examiner Interview Summary dated Jan. 22, 2016", 3 pgs.
"U.S. Appl. No. 14/311,938, Non Final Office Action dated Nov. 2, 2015", 14 pgs.
"U.S. Appl. No. 14/311,938, Notice of Allowance dated Feb. 29, 2016", 5 pgs.
"U.S. Appl. No. 14/311,938, Response filed Jan. 18, 2016 to Non Final Office Action dated Nov. 2, 2015", 7 pgs.
"U.S. Appl. No. 14/491,639, Non Final Office Action dated Apr. 8, 2016", 16 pgs.
"U.S. Appl. No. 14/491,639, Response filed Aug. 8, 2016 to Non Final Office Action dated Apr. 8, 2016", 9 pgs.
"U.S. Appl. No. 14/659,655, Non Final Office Action dated Jan. 21, 2016", 10 pgs.
"U.S. Appl. No. 14/659,655, Preliminary Amendment filed Mar. 18, 2015", 47 pgs.
"U.S. Appl. No. 14/659,655, Response filed Apr. 20, 2016 to Non Final Office Action dated Jan. 21, 2016", 31 pgs.
"Comparison of the UP Alternatives", R2-132338, 3GPP TSG-RAN WG2 Meeting #83, Barcelona, Spain, NSN, Nokia Corporation, NTT DOCOMO, Inc., Samsung, (Aug. 2013), 5 pgs.
"Data split options and considerations on U-plane protocol architecture for dual-connectivity", R2-131054, 3GPP TSG-RAN WG2 Meeting #81bis, Chicago, USA NOKIA Siemens Networks, (Apr. 2013), 9 pgs.
"Discussion on Multi-level Prach Coverage Enhancement", R1-140616 3GPP TSG RAN WG1 Meeting #76 NTT DOCOMO, (Feb. 2014), 1-6.
"Evolved Universal Terrestrial Radio Access (E-UTRA); Multiplexing and channel coding", 3GPP TS 36.212 version 8.8.0 Release 8 LTE, (Jan. 2010), 62 pgs.
"Evolved Universal Terrestrial Radio Access (E-UTRA); Physical channels and modulation", 3GPP TS 36.211 version 9.1.0 Release 9 LTE, (Apr. 2010), 87 pgs.
"Evolved Universal Terrestrial Radio Access (E-UTRA); Physical layer procedures", 3GPP TS 36.213 V11.0.0 3rd Generation Partnership Project; Technical Specification Group Radio Access Network;, (Sep. 2012), 143 pgs.
"Evolved Universal Terrestrial Radio Access (E-UTRA); Radio Resource Control (RRC); Protocol specification", 3GPP TS 36.331 version 8.6.0 Release 8 ETSI, (Jul. 2009), 211 pgs.
"Further considerations on MTC coverage enhancement", Motorola Mobility, R1-132467, 3GPP TSG RAN WG1 Meeting #73, Fukuoka, Japan, (May 20-24, 2013), 1-3.

(56) References Cited

OTHER PUBLICATIONS

"Further discussion on resource allocation for D2D discovery", R1-134116 3GPP TSG RAN WG1 Meeting #74bis CATT, (Oct. 11, 2013), 1-6.
"Impacts of Splitting a Single EPS Bearer between Two (or more) eNBs", R2-131401, 3GPP TSG RAN WG2 Meeting #81bis. Chicago, USA, Intel Corporation, (Apr. 2013), 9 pgs.
"Indian Application Serial No. 201647004844, Voluntary Amendment dated Aug. 3, 2016", 14 pgs.
"Inter-corresponding sets of resources for D2D discovery", R1-134365 3GPP TSG RAN WG1 Meeting #74bis HTC, (Oct. 11, 2013), 1-2.
"International Application Serial No. PCT/US2014/050214, International Preliminary Report on Patentability dated Feb. 18, 2016", 7 pgs.
"International Application Serial No. PCT/US2014/050214, International Search Report dated Nov. 19, 2014", 4 pgs.
"International Application Serial No. PCT/US2014/050214, Written Opinion dated Nov. 19, 2014", 5 pgs.
"International Application Serial No. PCT/US2014/056003, International Preliminary Report on Patentability dated Mar. 31, 2016", 7 pgs.
"International Application Serial No. PCT/US2014/056003, International Search Report dated Dec. 16, 2014", 4 pgs.
"International Application Serial No. PCT/US2014/056003, Written Opinion dated Dec. 16, 2014", 5 pgs.
"International Application Serial No. PCT/US2014/056909, International Preliminary Report on Patentability dated May 12, 2016", 6 pgs.
"International Application Serial No. PCT/US2014/056909, International Search Report dated Dec. 26, 2014", 3 pgs.
"International Application Serial No. PCT/US2014/056909, Written Opinion dated Dec. 26, 2014", 4 pgs.
"International Application Serial No. PCT/US2014/061569, International Preliminary Report on Patentability dated May 12, 2016", 8 pgs.
"International Application Serial No. PCT/US2014/061569, International Search Report dated Jan. 16, 2015", 3 pgs.
"International Application Serial No. PCT/US2014/061569, Written Opinion dated Jan. 16, 2015", 6 pgs.
"International Application Serial No. PCT/US2014/062349, International Preliminary Report on Patentability dated May 12, 2016", 10 pgs.
"International Application Serial No. PCT/US2014/062349, International Search Report dated Jan. 26, 2015", 4 pgs.
"International Application Serial No. PCT/US2014/062349, Written Opinion dated Jan. 26, 2015", 8 pgs.
"International Application Serial No. PCT/US2014/062533, International Preliminary Report on Patentability dated May 12, 2016", 8 pgs.
"International Application Serial No. PCT/US2014/062533, International Search Report dated Jan. 21, 2015", 3 pgs.
"International Application Serial No. PCT/US2014/062533, Written Opinion dated Jan. 21, 2015", 6 pgs.
"International Application Serial No. PCT/US2014/063080, International Preliminary Report on Patentability dated May 12, 2016", 7 pgs.
"International Application Serial No. PCT/US2014/063080, International Search Report dated Feb. 12, 2015", 4 pgs.
"International Application Serial No. PCT/US2014/063080, Written Opinion dated Feb. 12, 2015", 5 pgs.
"International Application Serial No. PCT/US2014/063434, International Preliminary Report on Patentability dated May 12, 2016", 10 pgs.
"International Application Serial No. PCT/US2014/063434, International Search Report dated Feb. 16, 2015", 4 pgs.
"International Application Serial No. PCT/US2014/063434, Written Opinion dated Feb. 16, 2015", 8 pgs.
"LS on signalling of multiple frequency band indicators; prioritization of frequency bands supported", R2-122009, 3GPP TSG RAN WG2 Meeting #78 Ericsson, (May 25, 2012), 1 pg.
"On MFBI and EARFCN extension", GP-130431 3GPP TSG GERAN#58 Renesas Mobile Europe Ltd.,, (May 2013), 1-5 pgs.
"On Resource Allocation and System Operation for D2D Discovery", R1-135119 3GPP TSG RAN WG1 Meeting #75 Intel Corporation, (Nov. 15, 2013), 1-6.
"PBCH Coverage Enhancement", Qualcomm Inc, RI-131397, 3GPP TSG-RAN WG1 Meeting #72bis, Chicago. USA, [Online]. Retrieved from the Internet: <URL: http://www.3gpp.org/ftp/tsg_ran/WG1_RL1/TSGRI_72b/Docs/R1-131397.zip>, (Apr. 15-19, 2013).
"PBCH Coverage Extension for MTC Devices", ITRI, R1-132256, 3GPP TSG RAN WG1 Meeting #73, Fukuoka. Japan, [Online]. Retrieved from the Internet: <URL: http://www.3gpp.org/ftp/tsg_ran/WG1_RL1/TSGRI_73/Docs/R1-32256.zip>, (May 20-24, 2013), 1-3.
"PBCH coverage improvement for low-cost MTC UEs", CATT, R1-130982, 3GPP TSG-RAN WG1 Meeting #72bis, Chicago, USA, [Online]. Retrieved from the Internet: <URL: http://www.3gpp.org/ftp/tsg_ran/WG1_RL1/TSGRI_72b/Docs/R1-130982.zip>, (Apr. 15-19, 2013), 1-4.
"Physical Random Access Channel Coverage Enhancement", R1-134303 TSG RAN WG1 Meeting #74bis, Guangzhou, China ZTE, (Sep. 28, 2013), 1-16.
"PRACH coverage enhancement for MTC UEs", R1-140278 3GPP TSG RAN WG1 Meeting #76 ZTE, (Feb. 2014), 1-8.
"PRACH resource multiplexing to support low cost MTC and coverage enhancement", R1-140027 3GPP TSG RAN WG1 Meeting #76, (Feb. 2014), 1-6.
"Resource Allocation for D2D Discovery", R1-134232, 3GPP TSG RAN WG1 Meeting #74bis Alcatel-Lucent Shanghai Bell, Alcatel-Lucent, (Oct. 11, 2013), 1-2.
"Uplink scheduling and BSRs with dual connectivity", R2-133412, 3GPP TSG-RAN WG2 Meeting #83bis, Ljubljana,Slovenia Ericsson, (Oct. 2013), 3 pgs.
"3rd Generation Partnership Project; Technical Specification Group Core Network and Terminals; General Packet Radio Service (GPRS); Serving GPRS Support Node (SGSN)—Visitors Location Register (VLR); Gs interface layer 3 specification (Release 11)", 3GPP TS 29.018, V11.6.0, (Mar. 2013), 62 pgs.
"3rd Generation Partnership Project; Technical Specification Group Core Network and Terminals; Mobile radio interface Layer 3 specification; Core network protocols; Stage 3 (Release 11)", 3GPP TS 24.008, V 11.8.0, (Sep. 2013), 677 pgs.
"3rd Generation Partnership Project; Technical Specification Group Core Network and Terminals; Non-Access-Stratum (NAS) protocol for Evolved Packet System (EPS); Stage 3 (Release 11)", 3GPP TS 24.301, V11.8.0, (Sep. 2013), 345 pgs.
"Chinese Application Serial No. 201480039337.1, Office Action dated Dec. 5, 2017", 11 pgs.
"European Application Serial No. 14834710.7, Response Filed Oct. 9, 2017 to Extended European Search Report dated Mar. 22, 2017", 55 pgs.
"European Application Serial No. 17170538.7, Extended European Search Report dated Sep. 12, 2017", 10 pgs.
Mediatek Inc., "On Required System Functionalities for MTC UEs Operating in Enhanced Coverage Mode", R1-130218, 3GPP TSG RAN WG1 Meeting #72, St Julian's, Malta, [Online] retrieved from the internet: <(http://www.3gpp.org/ftp/tsg_ran/wg1_rl1/TSGR1_72/Docs/R1-130218.zip)>, (Jan. 19, 2013), 6 pgs.
U.S. Appl. No. 15/717,540, filed Sep. 27, 2017, Signaling for Inter-Cell D2D Discovery in an LTE Network.
"European Application Serial No. 14834710.7, Extended European Search Report dated Mar. 22, 2017", 9 pgs.
Alacatel, Lucent, "Feasibility of coverage extension of physical Channels for MTC devices", 3GPP DRAFT; R1-130462—REL-12 MTC Coverage—Coverage EXT PHY Channels V0.3, 3rd Generation Partnership Project (3GPP), Mobile Competence Centre ; 650, Route Des Lucioles ; F-06921 Sophia-Antipolis C, [Online] retrieved from the internet: <http://www.3gpp.org/ftp/tsg_ran/WG1_RL1/TSGR1_72/Docs/>, (Jan. 19, 2013), 7 pgs.
Ericsson, et al., "Coverage enhancements for MTC—System informa", 3GPP DRAFT; R1-131680 Coverage Enhancements for MTC System Information, 3rd Generation Partnership Project (3GPP), Mobile Competence Centre ; 650, Routedes Lucioles ; F-06921 Sophia-

(56) References Cited

OTHER PUBLICATIONS

Antipolis Cedex, [Online] retrieved from the internet: <http://www.3gpp.org/ftp/tsg_ran/WG 1 _RL1 /TSG R1 _72b/Docs/>, (Apr. 16, 2013), 8 pgs.

U.S. Appl. No. 15/730,287, filed Oct. 11, 2017, Resource Allocation for D2D Discovery in an LTE Network.

U.S. Appl. No. 15/862,181, filed Jan. 4, 2018, Signaling Extended EARFCN and E-UTRA Bands in UMTS Networks.

"Chinese Application Serial No. 201610816127.X, Office Action dated Jan. 29, 2019", w/o English Translation, 8 pgs.

* cited by examiner

COVERAGE EXTENSION LEVEL FOR COVERAGE LIMITED DEVICE

RELATED APPLICATIONS

This application is a continuation of U.S. patent application Ser. No. 14/311,938, filed Jun. 23, 2014, now issued as U.S. Pat. No. 9,374,151, which claims the benefit of priority under 35 U.S.C. 119(e) to U.S. Provisional Patent Application Ser. No. 61/863,902, filed on Aug. 8, 2013; U.S. Provisional Patent Application Ser. No. 61/879,014, filed on Sep. 17, 2013; and U.S. Provisional Patent Application Ser. No. 61/898,425, filed on Oct. 31, 2013, each of which are incorporated herein by reference in their entirety.

TECHNICAL FIELD

Examples discussed herein generally relate to device or cellular network coverage enhancement. More specifically, examples generally relate to repeating a transmission of Master information Block (MIB) for coverage enhancement.

BACKGROUND

Machine-Type Communication (MTC), sometimes referred to as machine-to-machine (M2M) communication, is a promising and emerging technology to help enable a ubiquitous computing environment towards the concept of an "Internet of Things" (an internetworking of things). MTC enables machines to communicate directly with one another.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DESCRIPTION OF EMBODIMENTS

Figure 1:
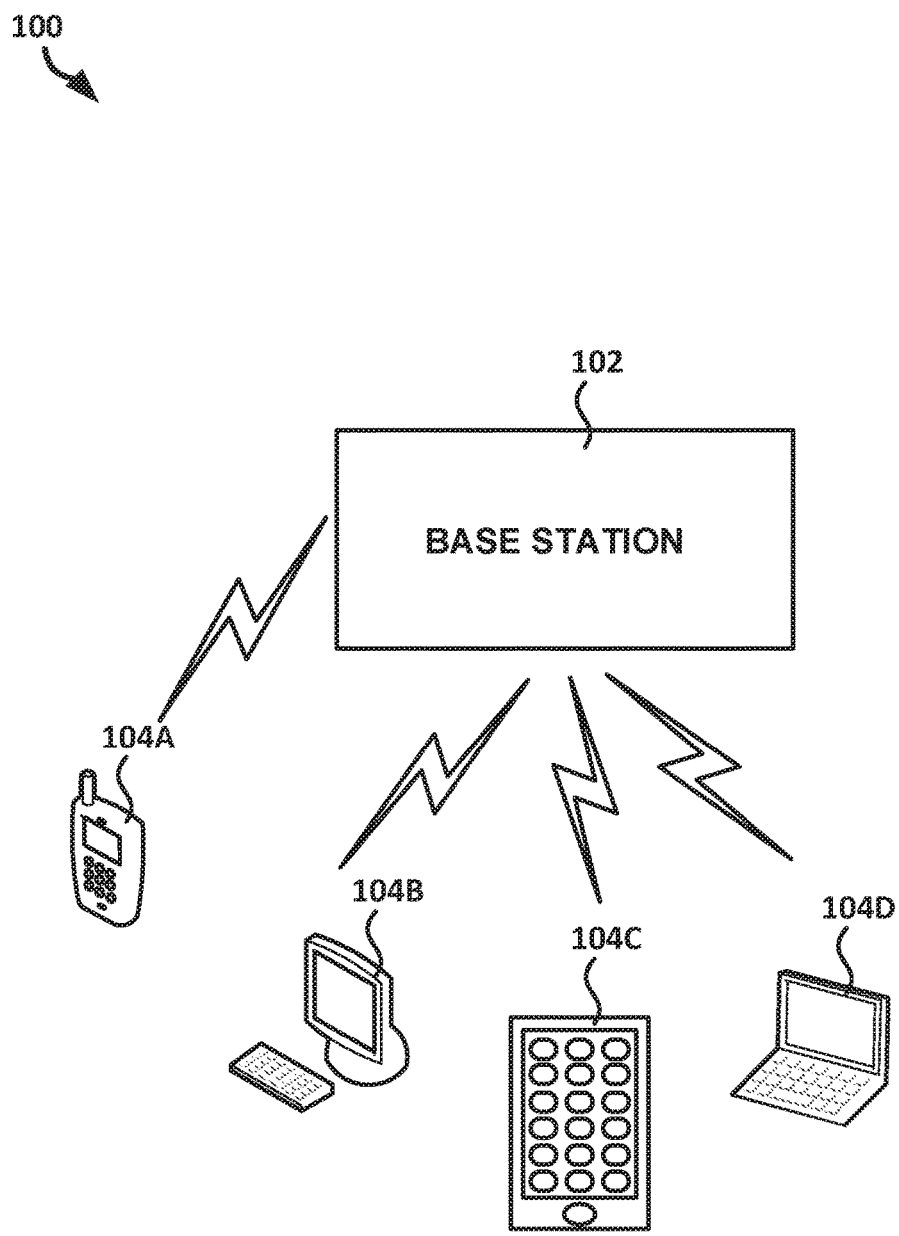
FIG. 1 shows a block diagram of an example of a wireless network, in accord with one or more embodiments.

Examples in this disclosure relate generally to a mechanism for indicating a coverage extension level for an MTC. More specifically, examples relate to using a Physical Random Access Channel (MACH) transmission to indicate a coverage extension level for an MTC device.

People and machines excel at different types of tasks. Machines are better at repetitive, well-defined operations, whereas people are better at operations that include insight, inference, interpretation, or operations that are not well-defined. Also, the speed at which a person can perform an operation can be slower than a machine can perform the same operation, or vice versa. As computing capabilities and technology evolve, a machine can become capable of performing an operation that a machine previously was not able to perform. Getting a machine to perform the operation can be more cost effective than having a person perform the operation, because a person is typically an hourly cost, while a machine is a one-time cost (plus maintenance cost). By replacing the person with a machine, the person can be freed to perform an operation that a machine cannot currently perform.

Existing mobile broadband networks (e.g., cellular networks) were designed to optimize performance mainly for human type of communications. The current networks are not optimized for MTC specific requirements. For instance, some MTC devices are installed in basements of residential buildings and these devices would experience significantly greater penetration losses on the radio interface than a network device on a street, for example. In order to help provide sufficient coverage of such MTC devices, special coverage enhancement considerations can be made, such as by using various physical channels.

Note that not all the MTC devices are located in a coverage hole requiring the worst case coverage enhancement target and some MTC device (e.g., User Equipment (UE)) may not need the coverage improvement or may not need the maximum coverage improvement to communicate with abuse station (e.g., an eNodeB). Thus, to save resources or power, it can be advantageous to provide a variety of coverage level extensions based on the needs of the varying MTC devices and their locations.

Potential MTC based applications include smart metering, healthcare monitoring, remote security surveillance, intelligent transportation system, among others. These services and applications can help stimulate the design and development of a new type of MTC device that can be integrated into current and next generation mobile broadband networks, such as Long Term Evolution (LTE) or LTE-Advanced (LIE-A).

According to the reference Maximum Coupling Loss (MCL) table in the 3GPP TR 36.888 V2.1.1 specification and assuming 4 dB Signal to Noise Ratio (SNR) loss when employing a single receive Radio Frequency (RF) chain (as specified for a new UE category), the required coverage enhancement target for Physical Broadcast Channel (PBCH) is 10.7 dB for a Frequency Division Duplexing (FDD) LTE system. Discussed herein are possible solutions to achieve the PBCH coverage enhancement target, such as for MTC devices of a Time Division Duplexing (TDD) or FDD LTE system.

In the current LIE system a Master Information Block (MIB) is transmitted on the PBCH with a periodicity of 40 ms. The PBCH symbol is mapped to the central 72 subcarriers of the Orthogonal Frequency Domain Multiplexing (OFDM) signal (which corresponds to the minimum possible LIE system bandwidth of six Resource Blocks (RBs)), regardless of the actual system bandwidth.

Repetition of PBCH transmission in the time domain can be an effective way to extend the coverage of a base station, such as for MTC devices or other devices. Due to the 40 ms periodicity of a System Frame Number (SEN) update in MIB, the PBCH repetition can be performed within the 40 ms period. Some options for the repetition can include repeating the PBCH transmission in sub-frame number zero onto other sub-frames in the same radio frame or repeating the PBCH transmission in other OFDM symbols of other sub-frames.

While the first option may be desirable from the specification perspective, due to limited specification impact, the latter one can allow more level of repetitions such that additional link budget gain can be achieved. For FDD system, based on the first approach, the maximum number of repetitions for PBCH within 40 ms period is ten. For the second option, in sub-frame number zero and sub-frame number five with two OFDM symbols allocated for Primary Synchronization Signal (PSS) or Secondary Synchronization Signal (SSS) transmission, two repetitions can be achieved, while in the remaining sub-frames, three repetitions can be achieved when two OFDM symbols are allocated for Physical Downlink Control Channel (PDCCH). According to this pattern design, the maximum number of repetitions can be twenty-eight. Note that the repetition pattern and allocated resources can be predefined for PBCH coverage enhancement based on repetition.

FIG. 1 shows a block diagram of an example of a portion of a cellular network 100, according to one or more embodiments. The cellular network can include a base station 102 communicatively coupled to one or more devices 104A, 104B, 104C, or 104D.

The base station 102 can include a radio transceiver. The base station 102 can receive UpLink (UL) data or a DownLink (DL) request from the device 104A-D. The base station 102 can transmit Downlink (DL) data or a UL request to the device 104A-D. The base station 102 can include an eNodeB, such as when the network 100 is an LTE network. The transceiver of the base station 102 can provide an interface for devices 104A-D to communicate to one another or a data network.

The device 104A-D can include a radio transceiver configured to communicate with the radio transceiver of the base station 102. The device 104A-D can include a phone (e.g., a smart phone), a laptop, a tablet, a personal digital assistant, a desktop computer, or an MTC device, among others. In the example where the network is an LTE network, the device 104A-D can include a UE.

An MTC device is an automatically-controlled (e.g., controlled without human interference or interaction after deployment, other than maintenance or deployment, etc. or unattended device. Examples MTC devices include a smart fridge that can measure temperature or pressure in the fridge or make a decision on the quality of food in the fridge, telematics (i.e. tracking of vehicles), security devices (e.g., cameras or motion detectors), meter readers, payment machines, vending machines, monitoring devices (e.g., heart rate, oxygen, air quality, blood-glucose, among others), among many others.

An MTC device is distinguished from a human communications device. A human communications device provides services such as voice calling, messaging, or web browsing. MTC devices may not provide such services.

Each of the devices 104A-D illustrated in FIG. 1 can have different requirements for coverage extension levels, such as can include no coverage extension needed to a maximum coverage extension level needed, and any coverage extension in between. For example, a device 104A-D located in a basement can require a coverage extension level in order to communicate with the base station 102, while a device 104A-D outside on a street can have no requirement for a coverage extension to communicate with the base station 102. To help reduce radio resource waste and device 104A-D or base station 102 power consumption, it can be advantageous for the device 104A-D to indicate to the base station 102 how much coverage extension the device 104A-D needs to reliably communicate with the base station 102.

The base station 102 can be configured to transmit MIB data to the device a number of times. The base station 102 can transmit the MIB data in any of sub-frames zero through sub-frame nine. The MIB data can be transmitted once or twice in sub-frames number zero and sub-frames number five. The MIB data can be transmitted one, two, or three times in sub-frames one, two, three, four, six, seven, eight, or nine. A rate matching operation can be performed, such as to determine which REs in a particular sub-frame will carry the MIB data.

FIGS. 2, 3, 4, and 5 show examples of sub-frame configurations for transmitting NUB data.

Figure 2:
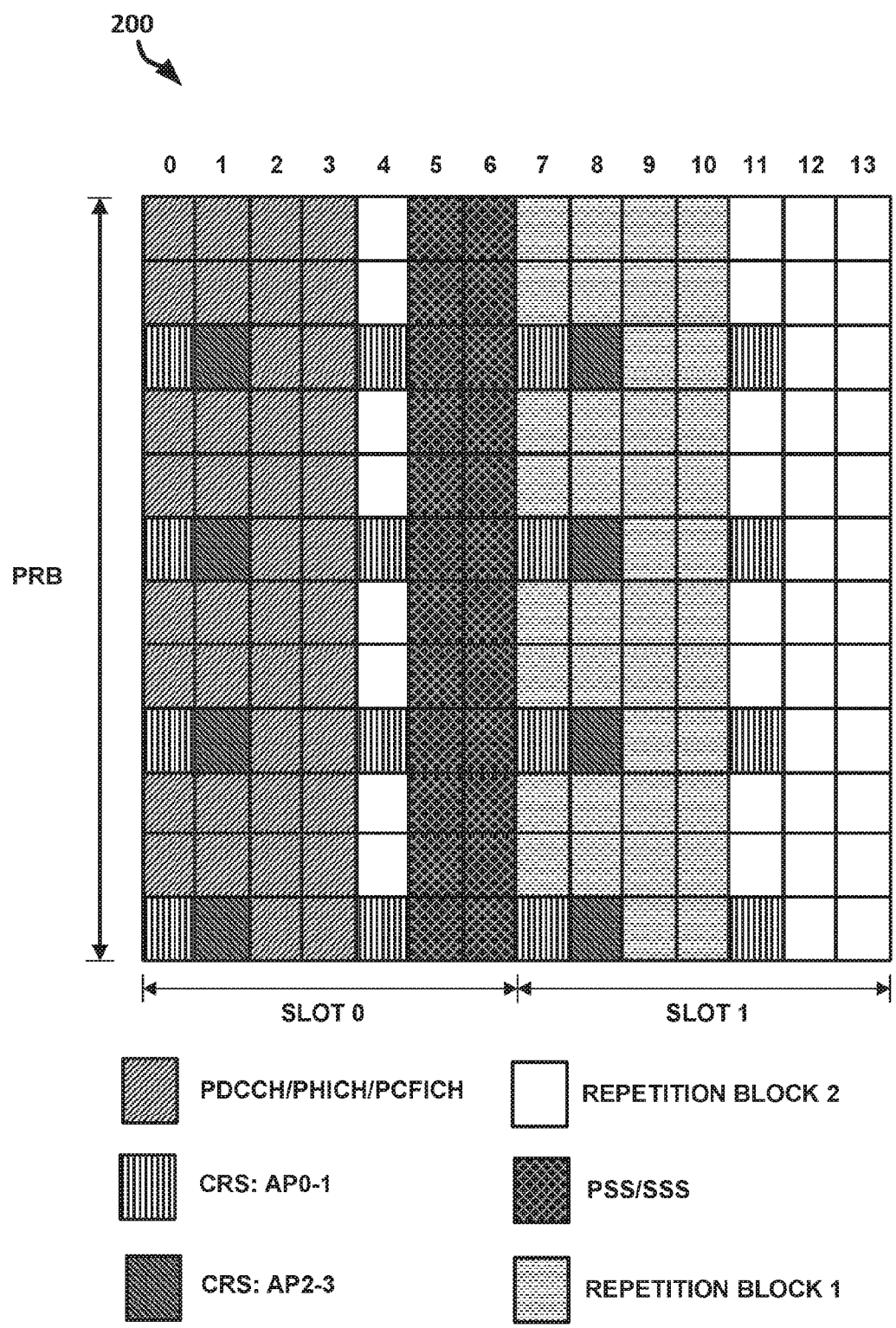
FIG. 2 shows a block diagram illustrating an example of a sub-frame and corresponding Resource Elements (REs), in accord with one or more embodiments.

FIG. 2 illustrates a block diagram of a sub-frame 200 that includes a PBCH repetition pattern, according to one or more embodiments. The PBCH repetition pattern can be repeated in one or more sub-frames, such as sub-frame number zero and sub-frame number five, for a Physical Resource Block (PRB) within the PBCH transmission. Currently, the center six PRBs are used for a PBCH transmission. For the remaining sub-frames, a variety of PBCH repetition patterns can be used see FIGS. 3, 4, and 5 for example patterns). A number of repetitions can be attained in each sub-frame, such as one, two, three, or more repetitions. In the example of FIG. 2, the PBCH data is repeated in symbols seven through ten or symbols four and eleven through thirteen, respectively.

Figure 3:
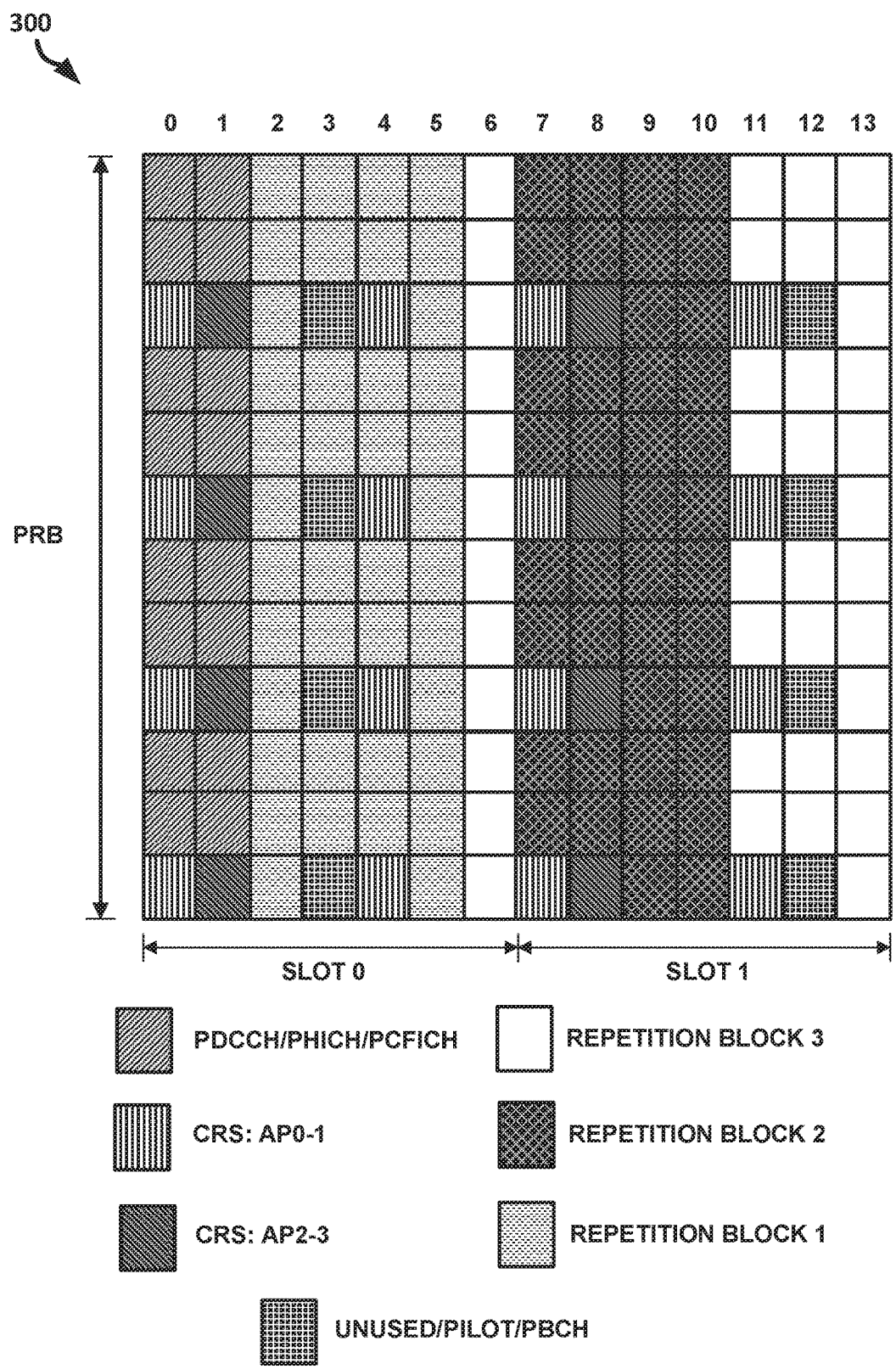
FIG. 3 shows a block diagram illustrating an example of another sub-frame and corresponding Resource Elements (REs), in accord with one or more embodiments.

FIG. 3 illustrates a block diagram of a sub-frame 300 that includes a PBCH repetition pattern, according to one or more embodiments. The first PBCH repetition pattern, as shown in FIG. 3, is carried in symbols two through five. The second PBCH repetition block, which occupies the majority the OFDM symbols seven through ten. According to this repetition pattern, a legacy device 104A-D can decode the PBCH from legacy PBCH position. A third repetition block can be carried in symbols six and eleven through thirteen of the sub-frame.

The base station 102 can schedule a Physical Downlink Shared Channel (PDSCH) transmission for legacy device 104A-D in a Resource Block (RB) that is not the six central PRBs, such that the impact on the legacy device 104A-D could be limited.

For coverage limited devices 104A-D, the predefined repetition levels can be employed for coherent combining to improve the coverage. Note that this disclosure can be optionally used by new devices in, such as in LTE Rel-12. New device and other devices, can be provided an improved coverage option for PBCH. These devices can either select the legacy PBCH resources or perform coherent combining over several repeated resources to decode MIB information.

In one or more embodiments, such as in repetition block number one or repetition block number three, four Resource Elements (REs) can be either unused, occupied by pilot symbols, or used for PBCH. A pilot symbol can be used to further improve the channel estimation performance. If the REs are unused or occupied by pilot symbols, the number of REs used for PBCH transmission in each repetition block remains the same as the legacy Mai, which may simplify the coherent combining at the device 104A-D or the base station 102.

In one or more embodiments, the four REs can be reserved for PBCH transmission, such that the total number of resource elements in one repetition block can be increased, such as to up to about 264 REs. By doing so, the coding rate for PBCH transmission can be reduced and thus performance gain can be achieved. Note that these four REs may be shifted to other OFDM symbols within the repetition block without CRS.

Figure 4:
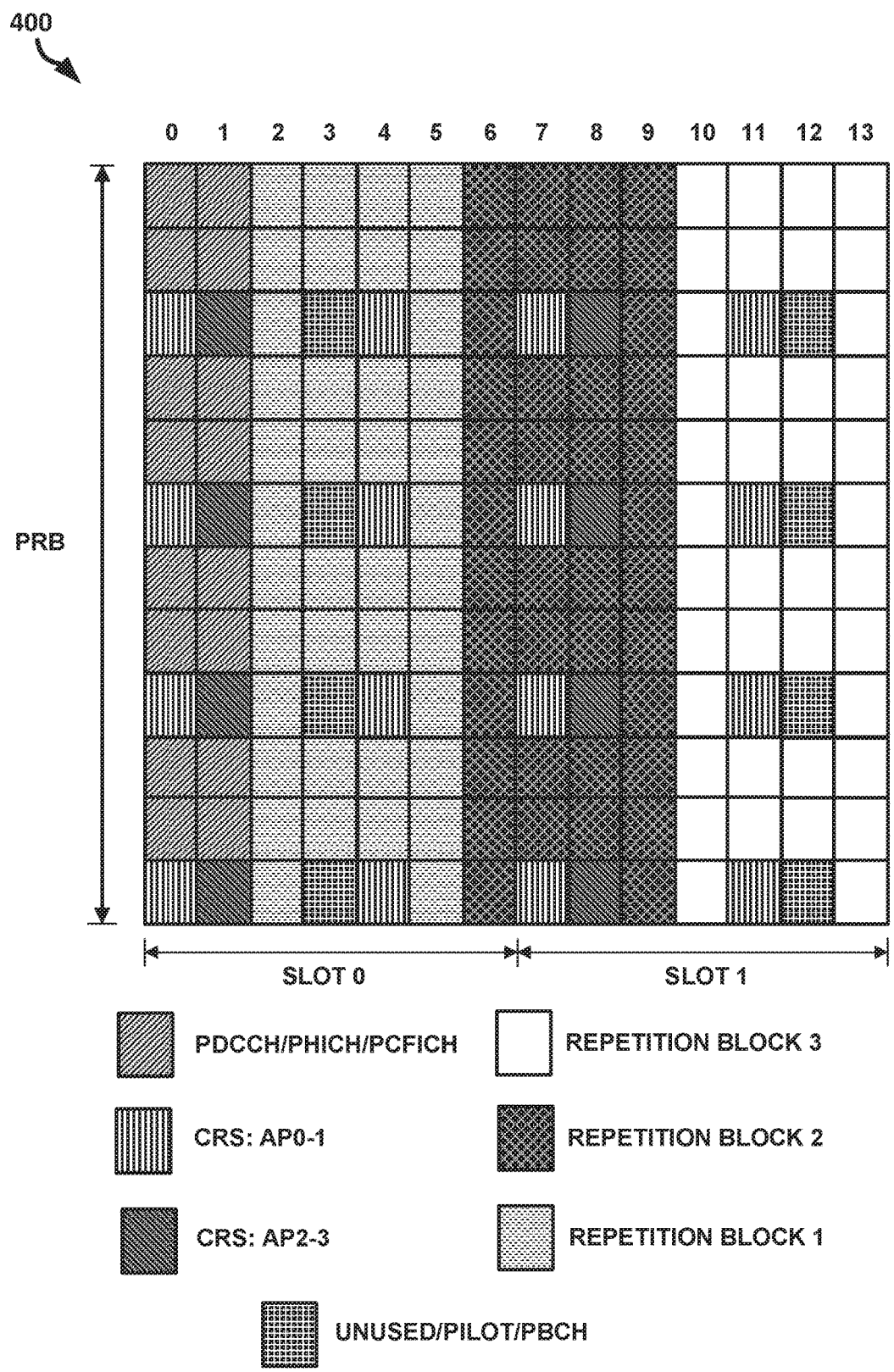
FIG. 4 shows a block diagram illustrating an example of another sub-frame and corresponding Resource Elements (REs), in accord with one or more embodiments.

FIG. 4 illustrates a block diagram of a sub-frame 400 that includes a PBCH repetition pattern, according to one or more embodiments. In FIG. 4, resources available for PBCH transmission are equally divided into three regions, with each region occupied by one repetition block. As shown in FIG. 4, the first region occupies the majority of symbols two through five, the second region occupies the majority of symbols six through nine, and the third region occupies the majority of symbols ten through thirteen. A similar design for unused, pilot, or extra PBCH symbols can be used as was discussed with regard to FIG. 3. For the repetition pattern of FIG. 4, the legacy devices 104A-D may not be able to decode the MIB information from the legacy PBCH position in the sub-frames with repeated PBCH transmission, since the position of the PBCH REs in the sub-frame have changed from occupying symbols seven through ten (see FIG. 3) to occupying symbols six through nine (see FIG. 4).

Figure 5:
FIG. 5 shows a block diagram illustrating an example of another sub-frame and corresponding Resource Elements (REs), in accord with one or more embodiments.

FIG. 5 illustrates a block diagram of a sub-frame 500 that includes a PBCH repetition pattern, in accord with one or more embodiments. In FIG. 5 the numbered REs indicate an RE that can be mapped to a PBCH RE, according to one or more embodiments. A rate-matching operation can be performed to fill out at least a portion of the available REs in a sub-frame. The rate-matching operation can be functionally equivalent to the repetition patterns as shown in FIGS. 2-4.

In one or more embodiments, a frequency first mapping can be applied for the repeated PBCH so as to be in-line with the existing PBCH mapping rule used by an LTE eNodeB. The encoded bits can be rate-matched, such as until all available REs in a sub-frame are filled in, such as after Tail Biting Convolutional Codes (TBCC) (e.g., with 1/3 mother coding rate). With this operation, all the available resources can be used for repeated PBCH, such as to make efficient use of the resources.

Note that only one PRB is shown. The number in the RE box represents the mapping order in modulation symbol level (e.g., Quadrature Phase Shift Keying (QPSK) symbol level). Two encoded bits can be mapped to each number.

Figure 6:
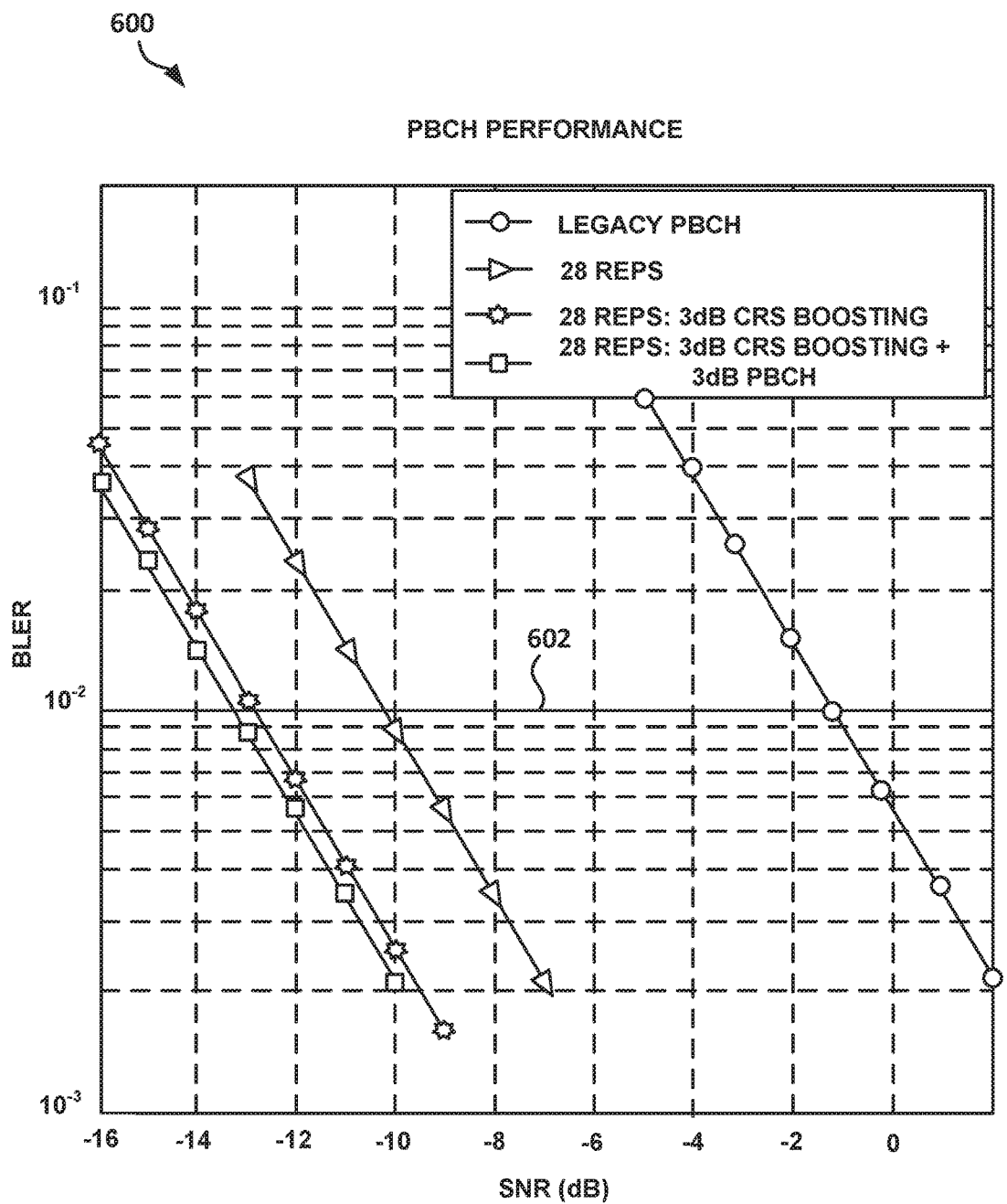
FIG. 6 shows a graph illustrating SNR vs Block Error Rate (BLER), in accord with one or more embodiments.

FIG. 6 illustrates a graph 600 of SNR vs. Block Error Rate (BLER) for a variety of device or base station configurations, according to one or more embodiments. The graph 600 shows the effect of Power Spectral Density (PSD) boosting (e.g., CRS boosting), repeating a PBCH transmission, combinations of repetitions and boosting, and no repetitions or boosting. PSI) boosting can be used by itself or in conjunction with other techniques to improve the coverage, such as for a coverage limited device. PSI) boosting can be applied on the REs used for CRS, PBCH, or both. FIG. 6 illustrates the link level performance with 3 dB PSD boosting on CRS only and on both PBCH and CRS in conjunction with 28 repetitions, respectively. For FDD LTE system, PBCH a coverage enhancement target can be achieved with twenty-eight repetitions and 3 dB CRS boosting. Line 602 indicates a BLER target.

Figure 7:
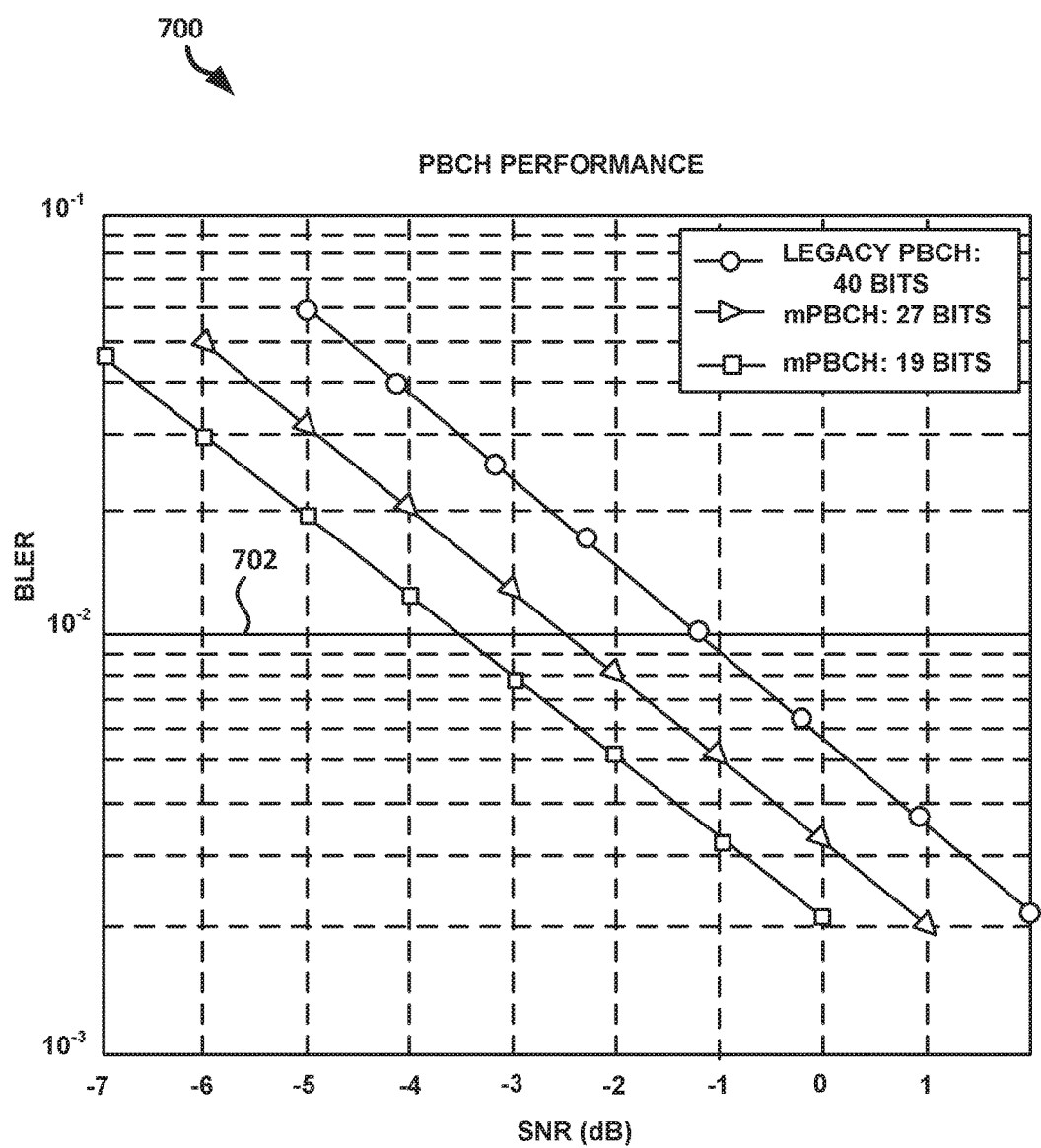
FIG. 7 shows another graph illustrating Signal to Noise Ratio (SNR) vs BLER, in accord with one or more embodiments.

FIG. 7 illustrates a graph 700 of SNR vs. BLER for a variety of device or base station configurations, according to one or more embodiments. Line 702 indicates a BLER target. For legacy PBCH, MIB contains a three-bit Down-Link (DL) system bandwidth, three-bit PHICH configuration, eight-bit System Frame Number (SFN) and ten spare bits. As specified for a new device category, PDCCH or Enhanced PDCCH (ePDCCH) is allowed to use the carrier bandwidth, which indicates that it may not be feasible to eliminate the three-bit DL system bandwidth. Considering the possibility of replacing PHICH by PDCCH with an UpLink (UL) grant and removing ten spare bits, the MIB content can be reduced to eleven bits, which can result in twenty-seven bits for PBCH (denoted as mPBCH in FIG. 7) after Cyclic Redundancy Check (CRC). Subsequently, if less CRC overhead is considered (e.g., eight CRC bits instead of sixteen CRC bits), the size of mPBCH after CRC can be further reduced to nineteen bits.

As can be seen in FIG. 7, the link level performance for mPBCH design with reduced legacy MIB content can be improved by reducing the MIB content. It can be observed that about a 1.4 dB and a 2.5 dB coding gain can be achieved when the size of mPBCH (after CRC) is reduced to twenty-seven bits and nineteen bits, respectively.

As described above, a number of repetitions, which can consume REs in the central six PRBs, can be used to meet the coverage enhancement target for PBCH. Since only a relatively small portion of devices may need or benefit from coverage enhancement, repetition of PBCH transmission may not be desirable in terms of cell spectrum efficiency, such as in a system with smaller carrier bandwidth. An intermittent transmission, which allows for more infrequent PBCH transmissions, can be considered as a mechanism to help reduce resource consumption using the coverage enhancement.

In the design of intermittent transmission for PBCH, various period lengths can be considered and the base station and device can be configured accordingly. In this way, the base station 102 can adjust the periodicity of a PBCH transmission, such as can be dependent on current device traffic (e.g., coverage enhancement needed traffic, such as an MTC UE or a legacy device traffic). More specifically, devices that can benefit from coverage enhancement can be scheduled to transmit the data during a time that the base station 102 is known to have less traffic. A lower duty cycle for a PBCH transmission (e.g., in the order of minutes or hours) may be beneficial in a higher traffic time, such as to reduce the impact on a legacy device. During the lower traffic time, the base station 102 can transmit the PBCH more frequently (e.g., in the order of milliseconds or seconds), such as to help coverage limited devices access the network more quickly. By employing different (e.g., configurable) period lengths for a PBCH transmission, a balance between an impact on a legacy device and access latency for a coverage limited device can be achieved. An example of different configurable period lengths is shown in FIG. 8.

Figure 8:
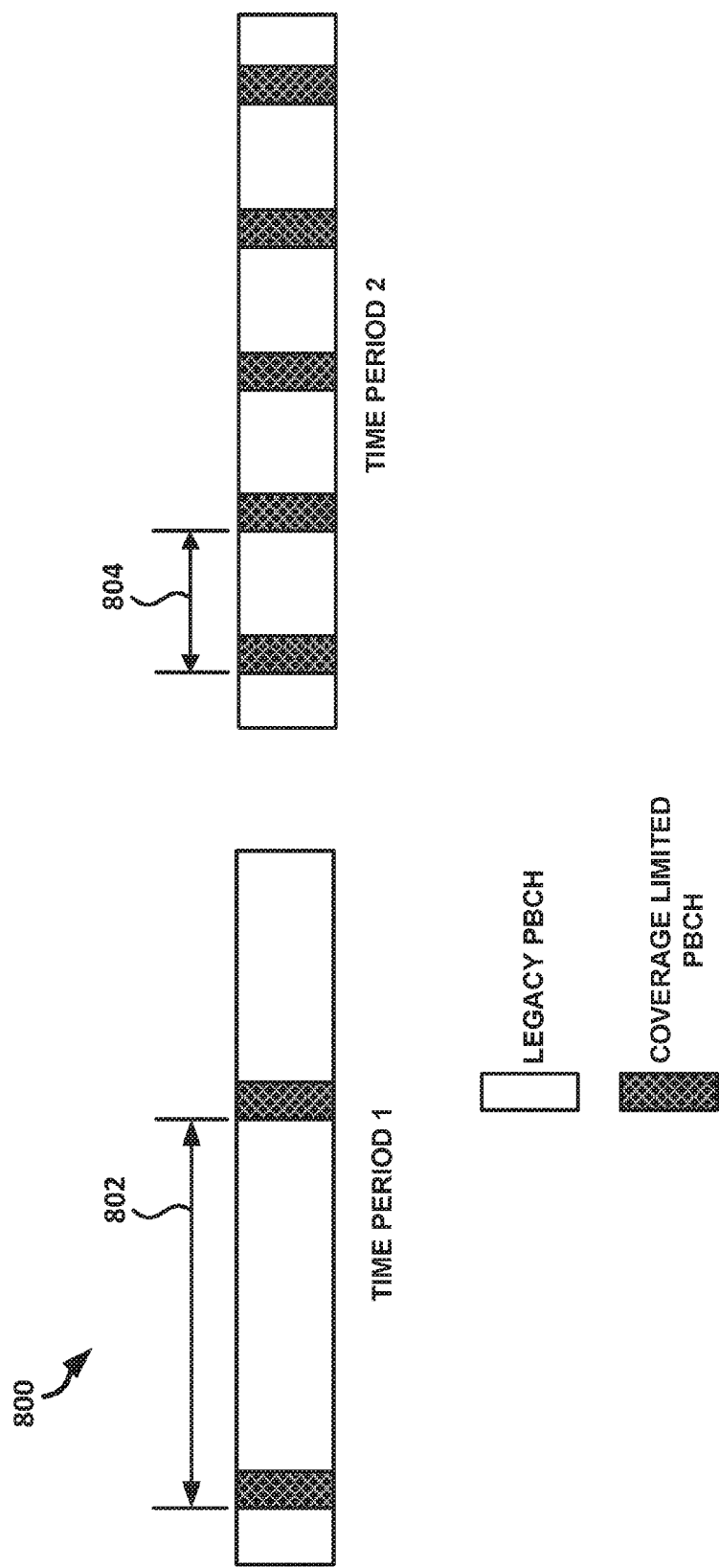
FIG. 8 shows a block diagram of time periods for transmitting MIB data to a coverage limited device, in accord with one or more embodiments.

FIG. 8 illustrates a PBCH intermittent transmission scheme 800, according to one or more embodiments. Note that during PBCH transmission, repetition, or PSD boosting can be used help to meet a coverage enhancement target. In particular, the PBCH transmission duration can be the order of 40 ms and can be at least 80 ms, such as to increase the number of repetitions that can be sent and help improve the decoding performance, such as to help ensure the proper reception of mPBCH for MTC devices. The base station 102 can be configured to transmit NUB to the device 104A-D with a time period between transmissions 802 during a first time of day and a time period between transmissions 804 during a second time of day. The time period between transmissions 802 can be longer than the time period between transmissions 804, such as to have a lower impact on legacy devices. The time period between transmissions 802 can correspond to a time of day that is known to have a higher (e.g., average) device traffic than the time period between transmissions 804. For example, the time period between transmissions 802 can be during business hours or during the hours of seven AM and eleven PM, and the time period transmissions 804 can be used during the rest of the time. That is only an example, the time period lengths and the times at which they are used are configurable, such as can be based on empirical data of traffic time or how many coverage limited devices need access to the cellular network resources.

The base station 102 can (e.g., autonomously) choose transmission opportunities or times for a PBCH transmission (e.g., an intermittent PBCH transmission). The PBCH transmission repetitions can be performed within an opportunity, in one or more embodiments. An opportunity can be defined as four radio frames (e.g., 40 milliseconds). In one or more embodiments, the base station 102 can transmit repeated PBCH within the opportunity. With this operation, the transmission of PBCH can be performed periodically or non-periodically. The base station 102 can decide on the implementation. Such a configuration can allow the base station 102 flexibility in handling the overhead related to repeated PBCH (Mal for coverage limited devices). The device 104A-D can be configured to assume that the PBCH may not always be transmitted at every opportunity (or instance) or that the PBCH will be transmitted at every possible instance if the opportunity is selected for the transmission, among other configurations.

In one or more embodiments, the base station 102 can transmit information to the device 104A-D to indicate the PBCH transmission configuration. In embodiments where the PBCH is transmitted periodically, the starting offset and/or the periodicity can be transmitted to the device 104A-D. The signaling can be provided by Level 1 (L1) control signaling or by higher layer signaling (e.g., Medium Access Control (MAC) Control Element (CE), Radio Resource Control (RRC), etc.). The signaling can be cell-specific signaling or device specific signaling.

In an initial network access stage, the device 104A-D may not be able to decode the PBCH transmission. The decoding of the PBCH transmission can include an appreciable amount of power consumption. After NIB information is received by the device 104A-D, the PBCH information (e.g., period length or starting offset) can be signaled to the device 104A-D. If the information is transmitted to a device 104A-D in an RRC connected mode, the device can use the information to decode PDSCH or to measure CSI-RS. Such decoding can help in an embodiment that includes rate matching. The PDSCH can be rate-matched around PBCH, and CSI-RS is not transmitted in the sub-frames, so transmitting PBCH can be problematic. The PBCH information configuration can be signaled to the device 104A-D using a HandOver (HO) command message. After the device 104A-D receives the HO command message from the serving cell, the device 104A-D can decode the MIB (PBCH for coverage limited devices 104A-D) to get the current SFN (System Frame Number) for the target cell. The information in HO command message can help the device 104A-D save power, by avoiding a decoding operation.

If the information is signaled to a device 104A-D in RRC idle mode, it can be beneficial the device 104A-D to read the MIB for the camped cell (e.g., the cell the device 104A-D is tuned to, to receive network system information) to save the power but also paging whether rate-matching is applied to PBCH or not. The configuration information can include the time information related to SEN. The configuration can include a bit indicating whether the current SFN of the serving cell is the same as that of the previous cell the device 104A-D was connected to. If the bit indicates the same SFN, the device can use the information from the previous cell, such as to save time or power. Otherwise, the device 104A-D can try to figure out the configuration of PBCH another way. In one or more embodiments, the network can assure the SFN is the same among the cells so that SFN does not need to be conveyed in the signal. In such embodiments, the device 104A-D can determine a PBCH configuration without SFN signaling.

In one or more embodiments, a restricted sub-frame can be used to signal a PBCH transmission configuration. Such an embodiment can facilitate a backward compatibility in applying CRS boosting. The legacy UE may not know whether a sub-frame contains PBCH or not, such as in situations where a new signaling is introduced. Thus, when CRS boosting is applied in a certain region in time or frequency domain, a Reference Signal Received Power (RSRP), a Reference Signal Received Quality (RSRQ), or a Radio Link Monitoring (RLM) measurement, using CRS can negatively affect the legacy device unless all CRSs in all regions (e.g., all REs and all sub-frames) apply the CRS boosting. The following solutions can be used to help keep backward compatibility. First, all CRSs can be boosted in all time and frequency resources or second, the device 104A-D can assume the PBCH is transmitted only in a Multi-Broadcast Single-Frequency Network (MBSFN) region of an MBSFN sub-frame, such as can be configured for the restricted sub-frame, such as can be given by measSubframePatternPCell in the RRC parameters. In such sub-frames, the RSRP, RSRQ, and RLM may not be performed. With such a configuration, the legacy device may not perform the RSRP, RSRQ, or RLM measurement on those configured sub-frames which are intended to transmit PBCH, while the legacy device does not recognize the PBCH.

Figure 9:
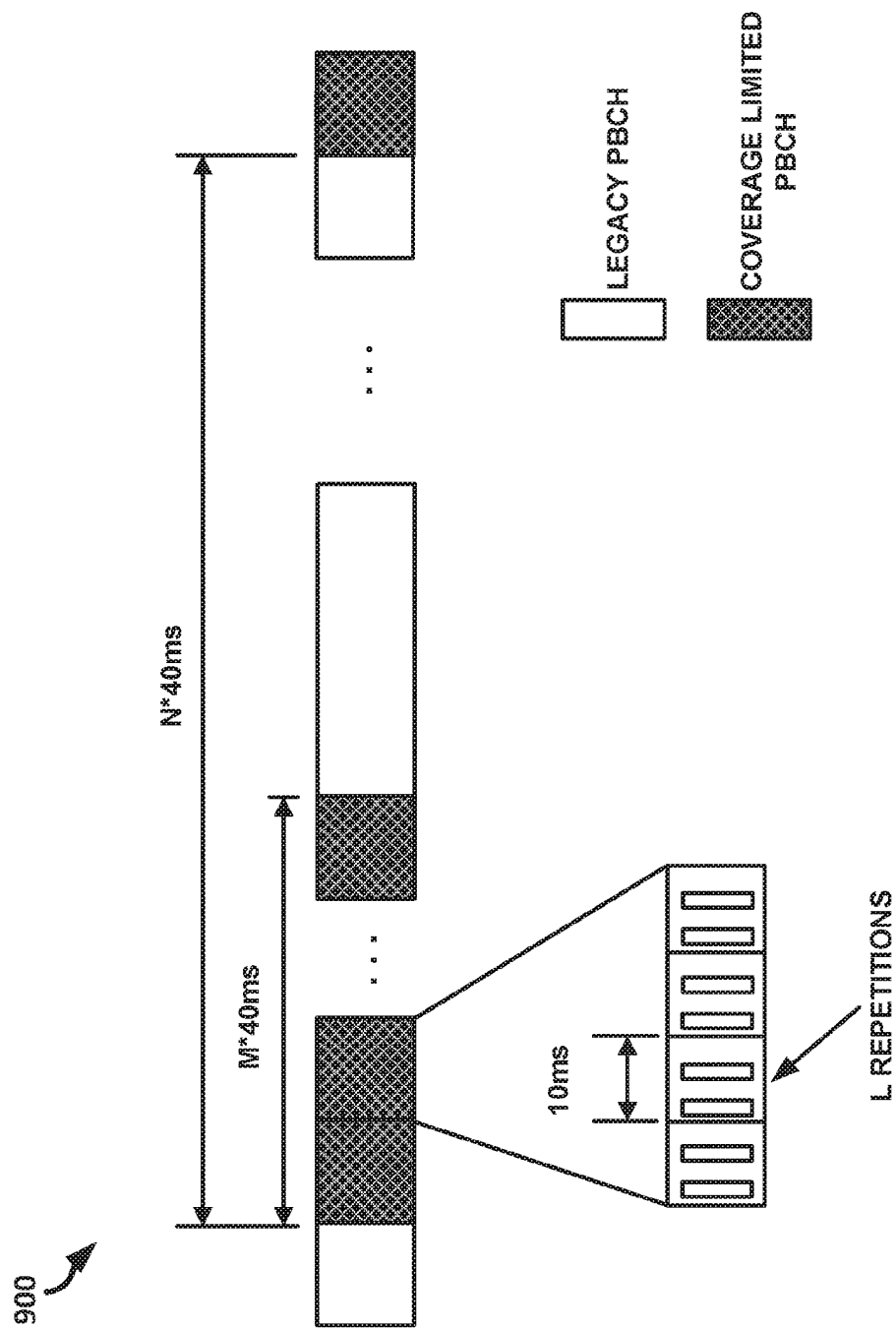
FIG. 9 shows another block diagram of time periods for transmitting MIB data, in accord with one or more embodiments.

FIG. 9 illustrates a PBCH resource allocation mechanism with intermittent repetition in which the repetition is scheduled in a continuous block of time, such as in the unit of 40 ms or a multiple thereof, according to one or more embodiments. In FIG. 9, N is a number of PBCH transmission periods, each transmission period in the unit of 40 ms, M is the number of PBCH blocks in the unit of 40 ms, and L is the number of PBCH repetitions within one radio frame. L, M, and N can be greater than or equal to one. PBCH repetitions can be employed across multiple sub-frames within the same frame or across OFDM symbols within the same sub-frame. As an example, the number of PBCH repetitions can be two. Such a configuration can reduce the device 104A-D power consumption. In such a configuration, sub-frame number zero and number five can be employed for PBCH repetitions, which can allow a unified solution to support both FDD and TDD systems.

In FIG. 9, there are L repetitions within 10 ms and the repetitions are applied four times in 40 ms. In the example of FIG. 9, there are two repetitions in 10 ms. The repeated PBCH during 40 ms can be repeated M times, such as in units of 40 ms. The next transmission for another repetition in the unit of 40 ms by M times may occur in the next N*40 ms. The repeated PBCH in the unit of 40 ms does not have to be consecutive, however a consecutively repeated PBCH in the unit of 40 ms can save detection time.

Figure 10A:
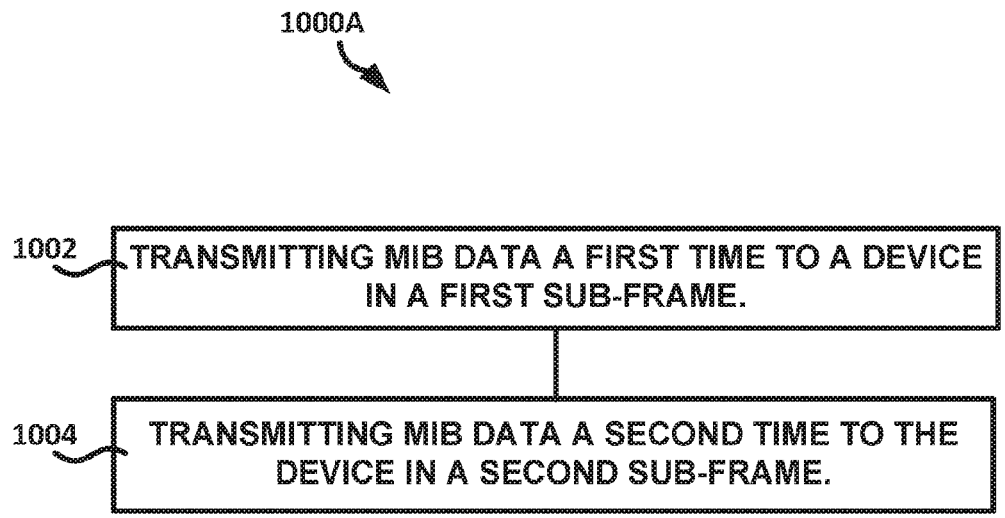
FIG. 10A shows a flow diagram of an example of a method for attaining a coverage enhancement, in accord with one or more embodiments.

FIG. 10A shows a flow diagram of an example of a method 1000A for repeating PBCH data to attain a coverage enhancement, according to one or more embodiments.

The method 1000A, as illustrated in FIG. 10, can be performed by the modules, components, devices, or systems described herein. 1000A includes: transmitting MIB a first time to a device in a first sub-frame, at operation 1002; and transmitting MIB data a second time to the device in a second sub-frame, at operation 1004. The MIB data can be transmitted to UE, such as in the PBCH.

The first or second sub-frames can be sub-frame zero or sub-frame five. The MIB data can be transmitted the first time in symbols four and symbols eleven through thirteen and the MIB data can be transmitted the first or second time in symbols seven through ten of the second sub-frame. The first or second sub-frames can include sub-frame one, sub-frame two, sub-frame three, sub-frame four, sub-frame six, sub-frame seven, sub-frame eight, or sub-frame nine. The MIB data can be transmitted the second time in symbols two through thirteen of the respective sub-frame. The MIB data can be transmitted the first time in symbols two through five in the respective sub-frame. The MIB data can be transmitted the first or second time in symbols six through thirteen in the respective sub-frame. The MIB data transmitted to a device can include less than forty bits of data. The MIB data, in one or more embodiments can include twenty-seven or nineteen bits of data.

The method 1000A can include rate matching to determine which Resource Elements (REs) of the first sub-frame and the second sub-frame will carry the MIB data. The method 1000A can include transmitting, using the PBCH, the MIB data a third time to the UE in the second sub-frame, wherein the first and second sub-frames are the same sub-frame, wherein the first and second sub-frames are sub-frame one, sub-frame two, sub-frame three, sub-frame four, sub-frame six, sub-frame seven, sub-frame eight, or sub-frame nine. The method 1000A can include PSD boosting the transmission of the first sub-frame or the second sub-frame, PSD boosting the transmission of the first sub-frame or the second sub-frame includes PBCH boosting or Cell-specific Reference Signal boosting the transmission.

Transmitting MIB data to the UE can include transmitting the MIB data to a coverage limited UE at a first time and at a second time after the first time. The time between the first time and the second time can be less during a time of day that has a lower average LTE traffic. The time between the first time and the second time is greater during a time of day that has a higher average UE traffic relative to the lower average UE traffic.

Figure 10B:
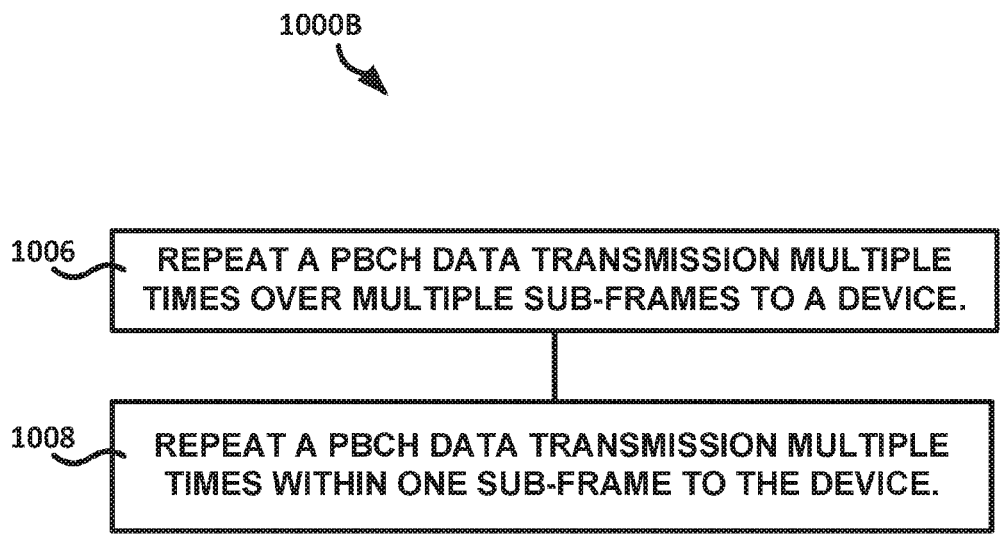
FIG. 10B shows a flow diagram of another example of a method for attaining a coverage enhancement, in accord with one or more embodiments.

FIG. 10B shows a flow diagram of an example of a method 1000B for repeating PBCH data to attain a coverage enhancement, according to one or more embodiments.

The method 1000B, as illustrated in FIG. 10, can be performed by the modules, components, devices, or systems described herein. 1000B includes: repeating a PBCH data transmission multiple times over multiple sub-frames to a device (e.g., a coverage limited MTC LTE), at operation 1006; or repeating the PBCH data transmission two or three times within one sub-frame to the device, at operation 1008.

The operation at 1006 or 1008 can include transmitting the PBCH data a first time in a first sub-frame and transmitting the PBCH data a second time in a second sub-frame. The first or second sub-frame can be sub-frame zero or sub-frame five. The PBCH data can include MIB data transmitted in symbols four and symbols eleven through thirteen in the first sub-frame and the PBCH data can include the MIB data transmitted in symbols seven through ten of the second sub-frame. The first or second sub-frame can be sub-frame one, sub-frame two, sub-frame three, sub-frame four, sub-frame six, sub-frame seven, sub-frame eight, or sub-frame nine. The PBCH data can include MIB data transmitted the second time in symbols two through thirteen of the first and second sub-frames. The PBCH data can include MIB data transmitted the first time in symbols two through five in the first sub-frame. The PBCH data can include MIB data transmitted the second time in symbols six through thirteen in the second sub-frame.

The operation at 1006 or 1008 can include transmitting the PBCH data transmission a third time to the coverage limited MTC LIE in a third sub-frame. The first, second, or third sub-frames can be the same sub-frame. The third sub-frame can sub-frame one, sub-frame two, sub-frame three, sub-frame four, sub-frame six, sub-frame seven, sub-frame eight, or sub-frame nine.

The operation at 1006 or 1008 can include repeating the PBCH data transmission multiple times including at least a first transmission at a first time and a second transmission at a second time. The time between the first time and the second time can be less during a time of day that has a lower average UE traffic and the time between the first time and the second time can be greater during a time of day that has a higher average UE traffic.

The method 1000B can include PSD boosting the transmission of the first sub-frame or the second sub-frame. PSD boosting the transmission of the first sub-frame or the second sub-frame includes PBCH boosting or Cell-specific Reference Signal boosting the transmission.

Figure 11:
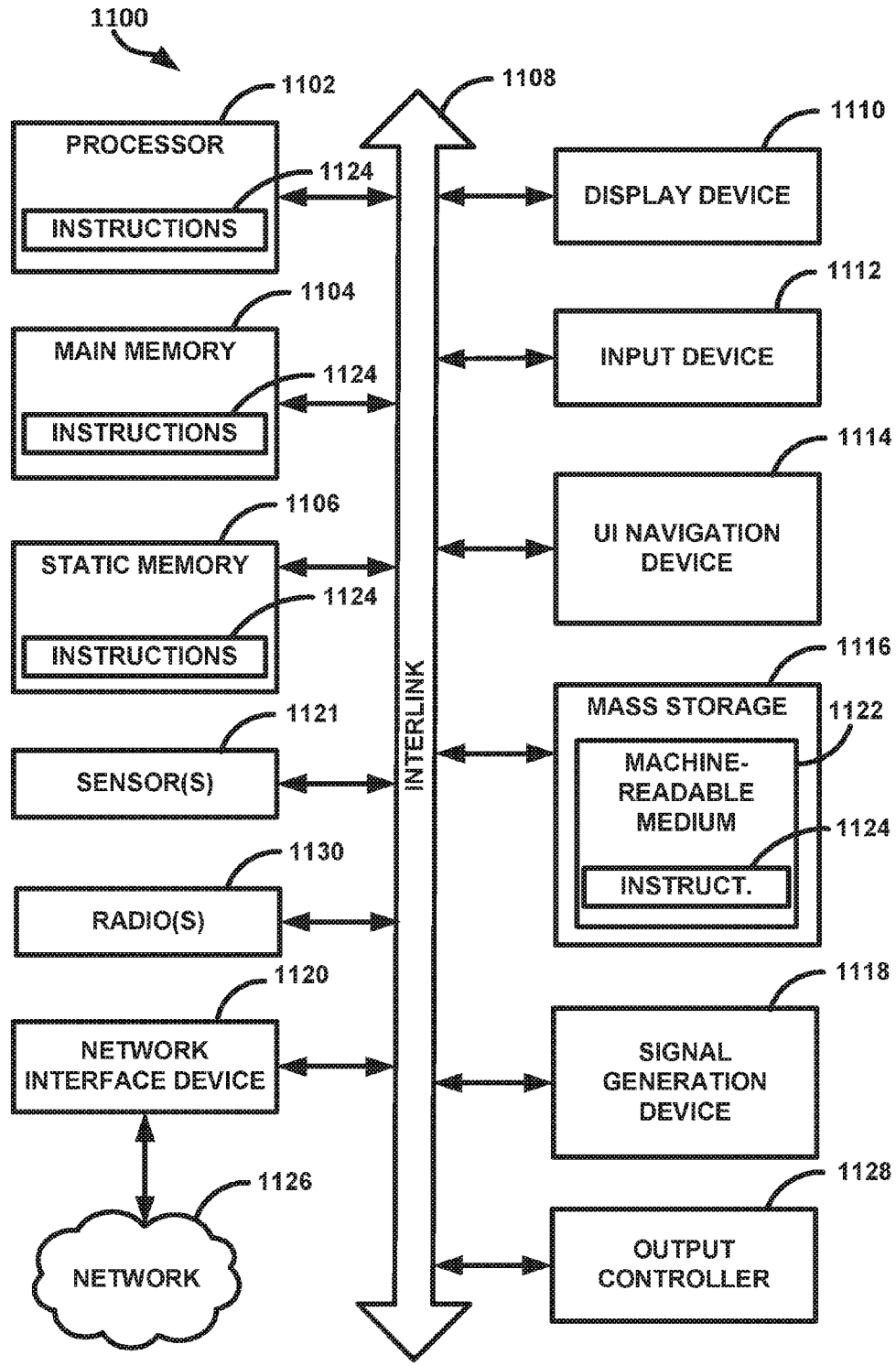
FIG. 11 shows block diagram of a computer system, in accord with one or more embodiments.

FIG. 11 illustrates a block diagram of an example of a wired or wireless device 1100 in accord with one or more embodiments. The device 1100 (e.g., a machine) can operate so as to perform one or more of the techniques (e.g., methodologies) discussed herein. In alternative embodiments, the device 1100 can operate as a standalone device or can be connected (e.g., networked) to other machines, such as the base station 102 or the device 104A-D. The device 1100 can be a part of the base station 102 or the device 104A-D, as discussed herein. In a networked deployment, the device 1100 can operate in the capacity of a server machine, a client machine, or both in server-client network environments. In an example, the device 1100 can act as a peer machine in peer-to-peer (P2P) (or other distributed) network environment. The device 1100 can include a personal computer (PC), a tablet PC, a set-top box (STB), a personal digital assistant (PDA), a mobile telephone; a web appliance, a network router, switch or bridge, or any machine capable of executing instructions sequential or otherwise) that specify actions to be taken by that machine, such as abase station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein; can include, or can operate on, logic or a number of components, modules, or mechanisms. Modules are tangible entities e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Device (e.g., computer system) 1100 can include a hardware processor 1102 (e.g., a central processing unit (CPU), a graphics processing unit (GPU), a hardware processor core, or any combination thereof), a main memory 1104 and a static memory 1106, some or all of which can communicate with each other via an interlink (e.g., bus) 1108. The device 1100 can further include a display unit 1110, an alphanumeric input device 1112 (e.g., a keyboard), and a user interface (UI) navigation device 1114 (e.g., a mouse). In an example, the display unit 1110, input device 1112 and 111 navigation device 1114 can be a touch screen display. The device 1100 can additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The device 1100 can include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The device 1100 can include one or more radios 1130 (e.g., transmission, reception, or transceiver devices). The radios 1130 can include one or more antennas to receive or transmit signal transmissions. The radios 1130 can be coupled to or include the processor 1102. The processor 1102 can cause the radios 1130 to perform one or more transmit or receive operations. Coupling the radios 1130 to such a processor can be considered configuring the radio 1130 to perform such operations. The radio 1130 can be a communication network radio configured to communicate to a base station or other component of the communication network.

The storage device 1116 can include a machine readable medium 1122 on which is stored one or more sets of data structures or instructions 1124 (e.g., software) embodying or utilized by any one or more of the techniques or functions described herein. The instructions 1124 can also reside, completely or at least partially, within the main memory 1104, within static memory 1106, or within the hardware processor 1102 during execution thereof by the device 1100. In an example, one or any combination of the hardware processor 1102, the main memory 1104, the static memory 1106, or the storage device 1116 can constitute machine readable media.

While the machine readable medium 1122 is illustrated as a single medium, the term "machine readable medium" can include a single medium or multiple media (e.g., a centralized or distributed database, and/or associated caches and servers configured to store the one or more instructions 1124.

The term "machine readable medium" can include any medium that is capable of storing, encoding, or carrying instructions for execution by the device 1100 and that cause the device 1100 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 can further be transmitted or received over a communications network 1126 using a transmission medium via the network interface device 1120 utilizing any one of a number of transfer protocols (e.g., frame relay, internet protocol (IP); transmission control protocol (TCP), user datagram protocol (UDP), hypertext transfer protocol (HTTP), etc.). Example communication networks can include a local area network (LAN), a wide area network (WAN), a packet data network (e.g., the Internet mobile telephone networks (e.g., cellular networks), Plain Old Telephone (POTS) networks; and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 can include one or more physical jacks (e.g., Ethernet; coaxial, or phone jacks) or one or more antennas to connect to the communications network 1126. In an example, the network interface device 1120 can include a plurality of antennas to wirelessly communicate using at least one of single-input multiple-output (SIMO), multiple-input multiple-output (MIMO) or multiple-input single-output (MISO) techniques. The term "transmission medium" shall be taken to include any intangible medium that is capable of storing, encoding or carrying instructions for execution by the device 1100, and includes digital or analog communications signals or other intangible medium to facilitate communication of such software.

EXAMPLES AND NOTES

The present subject matter can be described by way of several examples.

Example 1 can include or use subject matter (such as an apparatus, a method, a means for performing acts, or a device readable memory including instructions that, when performed by the device, can configure the device to perform acts such as can include or use an eNodeB comprising a transceiver configured to repeat a Physical Broadcast Channel (PBCH) data transmission multiple times over multiple sub-frames to a coverage limited Machine Type Communication (MTC) User Equipment (UE), or repeat the PBCH data transmission multiple times within one sub-frame to the coverage limited MTC UE.

Example 2 can include or use, or can optionally be combined with the subject matter of Example 1, to include or use a processor coupled to the transceiver configured to perform a rate matching operation to determine which Resource Elements (REs) of the sub-frame or sub-frames will carry Master Information Block (MIB) data of the PBCH data.

Example 3 can include or use, or can optionally be combined with the subject matter of Example 1, to include or use, wherein the transceiver is configured to transmit the PBCH data a first time in a first sub-frame, wherein the first sub-frame is sub-frame zero or sub-frame five, wherein the transceiver is configured to transmit the PBCH data a second time in the second sub-frame, wherein the second sub-frame is sub-frame zero or sub-frame five, or wherein the PBCH data includes MIB data transmitted the first time in symbols four and symbols eleven through thirteen and transmitted the second time in symbols seven through ten of the second sub-frame.

Example 4 can include or use, or can optionally be combined with the subject matter of Example 1, to include or use, wherein the transceiver is configured to transmit the PBCH data a first time in a first sub-frame and wherein the transceiver is configured to transmit the PBCH data a second time in a second sub-frame, wherein the first and second sub-frames are one of sub-frame one, sub-frame two, sub-frame three, sub-frame four, sub-frame six, sub-frame seven, sub-frame eight, or sub-frame nine and wherein the PBCH data includes MIB data transmitted the first and second times in symbols two through thirteen of the respective sub-frame.

Example 5 can include or use, or can optionally be combined with the subject matter of Example 4, to include or use, wherein the PBCH data includes MIB data transmitted the first time in symbols two through five in the respective sub-frame and wherein the PBCH data include MIB data transmitted the second time in symbols six through thirteen in the respective sub-frame.

Example 6 can include or use, or can optionally be combined with the subject matter of Example 4, to include or use, wherein the transceiver is configured to transmit the PBCH data a third time to the UE in the second sub-frame, wherein the first and second sub-frames are the same sub-frame, wherein the first and second sub-frames are sub-frame one, sub-frame two, sub-frame three, sub-frame four, sub-frame six, sub-frame seven, sub-frame eight, or sub-frame nine.

Example 7 can include or use, or can optionally be combined with the subject matter of at least one of Examples 1-6, to include or use, wherein the transceiver configured to repeat the PBCH data transmission includes the transceiver configured to repeat the PBCH data transmission to the coverage limited MTC UE multiple times including at least a first transmission at a first time and a second transmission at a second time after the first time, respectively, wherein the time between the first time and the second time is less during a time of day that has a lower average UE traffic and the time between the first time and the second time is greater during a time of day that has a higher average HE traffic.

Example 8 can include or use, or can optionally be combined with the subject matter of at least one of Examples 1-7, to include or use wherein the transceiver is configured to transmit Power Spectral Density (PSD) boosted first sub-frame or second sub-frame.

Example 9 can include or use, or can optionally be combined with the subject matter of Example 8, to include or use, wherein the PSD boosted first or second sub-frame includes a PBCH boost or Cell-specific Reference Signal (CRS) boosted first or second sub-frame.

Example 10 can include or use, or can optionally be combined with the subject matter of at least one of Examples 1-9, to include or use, wherein the transceiver configured to transmit the MIB data the first time to the User Equipment (UE) includes transmitting less than forty bits of MIB data to the UE.

Example 11 can include or use, or can optionally be combined with the subject matter of Example 10, to include or use, wherein the transceiver configured to transmit the MIB data the first time to the UE includes transmitting twenty-seven or nineteen bits of MIB data to the UE.

Example 12 can include or use subject matter (such as an apparatus, a method, a means for performing acts, or a device readable memory including instructions that, when performed by the device, can configure the device to perform acts), such as can include or use repeating a Physical Broadcast Channel (PBCH) data transmission multiple times over multiple sub-frames to a coverage limited Machine Type Communication (MTC) User Equipment (UE), or repeating the PBCH data transmission multiple times within one sub-frame to the coverage limited MTC UE.

Example 13 can include or use, or can optionally be combined with the subject matter of Example 12, to include or use rate matching to determine which Resource Elements (REs) of the first sub-frame and the second sub-frame will carry Master Information Block (NUB) data of the PBCH data.

Example 14 can include or use, or can optionally be combined with the subject matter of Example 12, to include or use, wherein repeating the PBCH data transmission includes transmitting PBCH data a first time in a first sub-frame and transmitting PBCH data a second time in a second sub-frame, wherein the first sub-frame is sub-frame zero or sub-frame five, wherein the second sub-frame is sub-frame zero or sub-frame five, or wherein the PBCH data includes MIB data transmitted the first time in symbols four and symbols eleven through thirteen and the PBCH data includes the MIB data transmitted the second time in symbols seven through ten of the second sub-frame.

Example 15 can include or use, or can optionally be combined with the subject matter of Example 12, to include or use, wherein repeating the PBCH data transmission includes transmitting the PBCH data a first time in a first sub-frame and transmitting the PBCH data a second time in a second sub-frame, wherein the first sub-frame is sub-frame one, sub-frame two, sub-frame three, sub-frame four, sub-frame six, sub-frame seven, sub-frame eight, or sub-frame nine, wherein the second sub-frame is sub-frame one, sub-frame two, sub-frame three, sub-frame four, sub-frame six, sub-frame seven, sub-frame eight, or sub-frame nine, and wherein the PBCH data includes MIB data transmitted the second time in symbols two through thirteen of the first and second sub-frames.

Example 16 can include or use, or can optionally be combined with the subject matter of Example 15, to include or use, wherein the PBCH data include MIB data transmitted the first time in symbols two through five in the first sub-frame and wherein the PBCH data includes MIB data transmitted the second time in symbols six through thirteen in the second sub-frame.

Example 17 can include or use, or can optionally be combined with the subject matter of Example 16, to include or use, wherein repeating the PBCH data transmission includes transmitting the PBCH data a third time to the coverage limited MTC LTE in the second sub-frame, wherein the first and second sub-frames are the same sub-frame, wherein the first and second sub-frames are sub-frame one, sub-frame two, sub-frame three, sub-frame four, sub-frame six, sub-frame seven, sub-frame eight, or sub-frame nine.

Example 18 can include or use, or can optionally be combined with the subject matter of at least one of Examples 12-17, to include or use, wherein repeating the PBCH data transmission includes repeating the PBCH data transmission to the coverage limited MTC UE multiple times including at least a first transmission at a first time and a second transmission at a second time, wherein the time between the first time and the second time is less during a time of day that has a lower average UE traffic and the time between the first time and the second time is greater during a time of day that has a higher average UE traffic.

Example 19 can include or use, or can optionally be combined with the subject matter of at least one of Examples 12-18, to include or use Power Spectral Density (PSD) boosting the transmission of the first sub-frame or the second sub-frame.

Example 20 can include or use, or can optionally be combined with the subject matter of Example 19, to include or use, wherein PSD boosting the transmission of the first sub-frame or the second sub-frame includes PBCH boosting or Cell-specific Reference Signal (CRS) boosting the transmission.

Example 21 can include or use, or can optionally be combined with the subject matter of at least one of Examples 12-20, to include or use, wherein transmitting, using the PBCH, MIB data to a User Equipment (UE) includes transmitting less than forty bits of MIB data to the UE.

Example 22 can include or use, or can optionally be combined with the subject matter of Example 21, to include or use, wherein transmitting, using the PBCH, MIB data to a User Equipment (UE) includes transmitting twenty-seven or nineteen bits of MIB data to the UE.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "compris-ing" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An apparatus of an enhanced node B (eNB), the apparatus comprising:
   memory; and processing circuitry, configured to:
      encode transmission symbols with a master information block (MIB), for transmission of a physical broadcast channel (PBCH), the MIB comprising information pertaining to a cell;
      map the transmission symbols to resource elements (REs) of a plurality of consecutive radio frames for a single transmission of the PBCH in each of the consecutive radio frames;
      when the cell is configured for repetition of the PBCH, map the transmission symbols to additional REs of each of the consecutive radio frames in accordance with a predetermined mapping for additional transmissions of the PBCH in each of the consecutive radio frames; and
      configure transceiver circuitry to transmit the PBCH in the REs of the consecutive radio frames, including the additional REs of the consecutive radio frames for repetition of the PBCH, wherein the predetermined mapping indicates a frame offset, a slot number and symbol number for each repetition of the PBCH in each of the consecutive radio frames,
      wherein when configured for time division duplexed (TDD) operation, the additional number of times is at most 5, and when configured for frequency division duplexed (FDD), the additional number of times is at most 4.

2. The apparatus of claim 1 wherein the processing circuitry is configured to refrain from mapping the transmission symbols for repetition of the PBCH in REs already used for transmission of cell-specific reference signals (CRS).

3. The apparatus of claim 2 wherein the processing circuitry is further configured to refrain from mapping the transmission symbols to the additional REs for transmission of the PBCH more than once in a radio frame when the cell is not configured for repetition of the PBCH.

4. The apparatus of claim 3, wherein the radio frames are FDD radio frames, and
wherein the transmission symbols are mapped to the additional REs of each of the consecutive radio frames in accordance with the predetermined mapping to transmit the PBCH an additional three or four times in each of the radio frames.

5. The apparatus of claim 3, wherein the radio frames are TDD radio frames, and
wherein the transmission symbols are mapped to the additional REs of each of the consecutive radio frames in accordance with the predetermined mapping to transmit the PBCH an additional three, four or five times in each of the radio frames.

6. The apparatus of claim 3, wherein the processing circuitry is to configure the cell for repetition of the PBCH to provide coverage enhancement for user equipment (UE) with poor channel conditions.

7. The apparatus of claim 3, wherein the processing circuitry is to configure the cell for repetition of the PBCH to provide coverage enhancement for machine-type communication (MTC) user equipments (UE) (MTC-UEs).

8. The apparatus of claim 1, wherein the processing circuitry is further configured to map synchronization signals, including a primary synchronization signal (PSS) and a secondary synchronization signal (SSS) to REs for transmission within each of the consecutive radio frames, the PSS and SSS configured for use in decoding the PBCH.

9. The apparatus of claim 1, wherein when the cell is configured for repetition of the PBCH, based on the predetermined mapping the PBCH is repeated:
four times in a first radio frame of the consecutive radio frames,
four times in a second radio frame of the consecutive radio frames,
four times in a third radio frame of the consecutive radio frames, and
three times in a fourth radio frame of the consecutive radio frames.

10. The apparatus of claim 1, wherein the apparatus further comprises the transceiver circuitry.

11. A non-transitory computer-readable storage medium that stores instructions for execution by processing circuitry of an enhanced node B (eNB), the processing circuitry configured by the instructions to:
encode transmission symbols with a master information block (MIB), for transmission of a physical broadcast channel (PBCH), the MIB comprising information pertaining to a cell;
map the transmission symbols to resource elements (REs) of a plurality of consecutive radio frames for a single transmission of the PBCH in each of the consecutive radio frames;
when the cell is configured for repetition of the PBCH, map the transmission symbols to additional REs of each of the consecutive radio frames in accordance with a predetermined mapping for additional transmissions of the PBCH in each of the consecutive radio frames;
configure transceiver circuitry to transmit the PBCH in the REs of the consecutive radio frames, including the additional REs of the consecutive radio frames for repetition of the PBCH, wherein the predetermined mapping indicates a frame offset, a slot number and symbol number for each repetition of the PBCH in each of the consecutive radio frames,
wherein the transmission symbols are mapped to the additional REs of each of the consecutive radio frames in accordance with the predetermined mapping to transmit the PBCH an additional number of times in each of the radio frames, and
wherein when configured for time division duplexed (TDD) operation, the additional number of times is at most 5, and when configured for frequency division duplexed (FDD), the additional number of times is at most 4.

12. The non-transitory computer-readable storage medium of claim 11 wherein the processing circuitry is configured to refrain from mapping the transmission symbols for repetition of the PBCH in REs already used for transmission of cell-specific reference signals (CRS).

13. The non-transitory computer-readable storage medium of claim 12 wherein the processing circuitry is further configured to refrain from mapping the transmission symbols to the additional REs for transmission of the PBCH more than once in a radio frame when the cell is not configured for repetition of the PBCH.

14. The non-transitory computer-readable storage medium of claim 13, wherein:
when the radio frames are FDD radio frames, the transmission symbols are mapped to the additional REs of each of the consecutive radio frames in accordance with the predetermined mapping to transmit the PBCH an additional three or four times in each of the radio frames, and
when the radio frames are TDD radio frames, the transmission symbols are mapped to the additional REs of each of the consecutive radio frames in accordance with the predetermined mapping to transmit the PBCH an additional three, four or five times in each of the radio frames.

15. The non-transitory computer-readable storage medium of claim 13, wherein the processing circuitry is to configure the cell for repetition of the PBCH to provide coverage enhancement for user equipment (UE) with poor channel conditions.

16. An apparatus of an enhanced node B (eNB), the apparatus comprising:
memory; and processing circuitry, configured to:
encode transmission symbols with a master information block (MIB), for transmission of a physical broadcast channel (PBCH), the MIB comprising information pertaining to a cell;
map the transmission symbols to resource elements (REs) of a plurality of consecutive radio frames for a single transmission of the PBCH in each of the consecutive radio frames;
map the transmission symbols to additional REs of each of the consecutive radio frames in accordance with a predetermined mapping for additional transmissions of the PBCH in each of the consecutive radio frames;

configure transceiver circuitry to transmit the PBCH in the REs of the consecutive radio frames, including the additional REs of the consecutive radio frames for repetition of the PBCH; and refrain from mapping the transmission symbols for repetition of the PBCH in REs already used for transmission of cell-specific reference signals (CRS), wherein the transmission symbols are mapped to the additional REs of each of the consecutive radio frames in accordance with the predetermined mapping to transmit the PBCH an additional number of times in each of the radio frames, and wherein when configured for time division duplexed (TDD) operation, the additional number of times is at most 5, and when configured for frequency division duplexed (FDD), the additional number of times is at most 4.

17. The apparatus of claim 16 wherein the predetermined mapping indicates a frame offset, a slot number and symbol number for each repetition of the PBCH in each of the consecutive radio frames.

18. The apparatus of claim 17 wherein the processing circuitry is configured to map the transmission symbols to the additional REs of each of the consecutive radio frames in accordance with the predetermined mapping when the cell is configured for repetition of the PBCH.

19. The apparatus of claim 18 wherein the processing circuitry is configured to refrain from mapping the transmission symbols to the additional REs of each of the consecutive radio frames in accordance with the predetermined mapping when the cell is not configured for repetition of the PBCH.

* * * * *